United States Patent [19]

Sciortino

[11] Patent Number: 4,796,876
[45] Date of Patent: Jan. 10, 1989

[54] ENGINE MOUNT

[75] Inventor: Giacomo Sciortino, Heidelberg, Fed. Rep. of Germany

[73] Assignee: Firma Carl Freudenberg, Weinheim an der Bergstrasse, Fed. Rep. of Germany

[21] Appl. No.: 35,990

[22] Filed: Apr. 8, 1987

[30] Foreign Application Priority Data

May 27, 1986 [DE] Fed. Rep. of Germany ....... 3617813

[51] Int. Cl.$^4$ .............................................. F16F 9/34
[52] U.S. Cl. .................................. 267/140.1; 267/220
[58] Field of Search ......................... 188/320; 248/562; 267/8 R, 35, 113, 140.1, 219, 220

[56] References Cited

U.S. PATENT DOCUMENTS

| 4,422,779 | 12/1983 | Hamaekers et al. | 267/140.1 X |
| 4,469,316 | 9/1984 | van der Boom et al. | 267/140.1 |
| 4,502,575 | 3/1985 | Fukushima et al. | 188/320 |
| 4,588,173 | 5/1986 | Gold et al. | 267/140.1 |
| 4,641,817 | 2/1987 | Clark et al. | 267/140.1 |

Primary Examiner—Duane A. Reger
Attorney, Agent, or Firm—Kenyon & Kenyon

[57] ABSTRACT

An engine mount with hydraulic damping has a partition wall penetrated by a throttle port and the partition wall is located between a working chamber and a compensating chamber. The throttle port can have several channel-shaped individual ports of different lengths and/or different cross sections. The partition wall carries an absorption mass mounted by an elastic annular diaphragm which can be moved between the working chamber and the compensating chamber within an area of play limited by stops.

8 Claims, 5 Drawing Sheets

ENGINE MOUNT

This application contains a similar disclosure to Applicant's copending application Ser. No. 035,987.

FIELD OF THE INVENTION

This invention relates to an engine mount having hydraulic damping. A working chamber is defined by a bearing member, a bearing spring and a bearing wall and a compensation chamber is defined by a resilient buffer wall with a partition wall disposed between the working chamber and the compensation chamber. A throttle port connects the working chamber and the compensation chamber in fluid communication. A hydraulic fluid fills the working chamber, the compensation chamber and the throttle port. A partial area of the partition wall comprise a compensating part. The compensating part is movable between the working chamber and the compensating chamber with its movement being limited by stops of the partition wall. The compensating part is located radially within the partition wall and is connected to the partition wall by an annular elastic diaphragm.

BACKGROUND OF THE INVENTION

German Patent Application No. 27 27 244 generally describes an engine mount of the type mentioned above. The throttle port thereof is located in the part of the partition wall, i.e., the compensating part, which can move or oscillate between the working chamber and the compensating chamber and is of short length. The motion of the compensating part of the partition wall is limited to an order of magnitude of a few tenths of a millimeter by stops placed on both its sides. The operating characteristics as well as the possibility of ease of manufacture are not very satisfying in this prior art design. The guarantee of little play of the movable parts of the partition wall create great difficulties under practical operating conditions.

OBJECTS OF THE INVENTION

It is an object of the present invention to provide an improved hydraulically damped engine mount of the type hereinbefore described which is simple to produce. It is a further object of the present invention to provide an improved hydraulically damped engine mount which simultaneously achieves improved damping of introduced large amplitude oscillations and improved insulation of introduced oscillations of less than 0.1 mm in amplitude. These and other objects of the present invention will be apparent from the following description and claims in conjunction with the drawings.

SUMMARY OF THE INVENTION

In accordance with the present invention, a hydraulically damped engine mount is provided wherein the compensating part of the partition wall, i.e., the part which moves or oscillates between the working chamber and the compensating chamber, comprises a circular inertial mass and the throttle port connecting the working chamber and the compensating chamber is formed in the shape of a channel.

The effectiveness of the engine mount according invention utilizes the nonlinearity of the hydraulic damping force, the proportionality of which is determined to the square of the relative velocity of the fluid through the throttle, as well as its effect on the (equivalent) fluid mass.

The working chamber, the compensating chamber and the throttle port of the engine mount according to the invention are filled with a low-viscosity, incompressible fluid. The incompressible fluid is subject to acceleration forces upon introduction of the oscillations occurring under normal operating conditions which is accompanied by a change of the hydraulic pressure. The compensating part, which is movable between the working chamber and the compensating chamber, comprising an absorption mass and experiences a complex deflection. This is continuously variable as a function of the forces introduced at any given time. In this way, different oscillation forms originate, which permits a lowering of the dynamic rigidity upon the introduction of high frequency oscillations above 30 Hertz. With the engine mount according to the present invention, excellent insulation of these oscillations is obtained. It is noteworthy that this insulating effect also occurs when simultaneously, low frequency oscillations below 20 Hertz are introduced into the engine mount. The mechanism of the operation of the engine mount according to the invention will be apparent from the physical equivalent diagram illustrated in FIG. 2. The listed values have the following meaning:

Force $F(t)$ and the road response velocity $Vo(t)$ are the interference parameters. $Fd$, $Fr$ are the damping forces.

For the passive dampener:

$$Fd = -Ro\ V + \gamma Rr\ Vl = Fr \qquad (1)$$

$$Ro = f(\gamma Rr) > 0 \qquad (2)$$

$$Ru = BRo \qquad (3)$$

$$Cr = uCo \qquad (4)$$

$$Cu = nCr \qquad (5)$$

M: Mass of the engine.
Mf: Equivalent mass of the fluid of the upper working chamber.
Mred: Mass of the reduced absorption system.
Co: Coupling spring rigidity of the upper working chamber.
Cu: Coupling spring rigidity of the lower working chamber.
Ro: Characteristic function of the channel system. It is a function determined by the throttle length, the diameter, the throttle shape, the kind of flow, the inertia of the fluid, and the ratio hydraulic compliance of the upper/lower working chamber.
$\gamma$: Ratio (damping effectiveness degree ratio) of the characteristic function of the compensating systems $Rr$, $B\ Ru$ with respect to the characteristic function of the channel system $Ro$.
B: Ratio (damping or effectiveness ratio) of the characteristic function $Ru$, $\gamma Rr$ with respect to the characteristic function of the channel system $Ro$.
u: Ratio of the complex rigidity of the absorption system (Mred) and the coupling spring rigidity $Co$.
n: Ratio of the complex rigidity of the absorption system (Mred) and the coupling spring rigidity $Cu$.
Cr: Characteristic function of the absorption system Mred. It is a function which depends on the design of the reduced absorption system and the coupling spring rigidity $Co$.

In view of the design of the engine mount according to the present invention, it has proven to be of advantage if the ratio of the entire present absorption mass and the proportionate mass of the engine is maximally 0.1, and the ratio of the rigidity of each annular diaphragm to the rigidity of the bearing spring is maximally 1.0. If one of the two parameters is varied, the other parameter must always be changed in the same direction. The initial coarse tuning can take place using theoretical calculations of which further explanations are not necessary for one skilled in the art. The fine tuning is reserved for the practical trials of a motor driven vehicle equipped with the engine mount of the invention under normal operating conditions.

A further improvement of the effectiveness can be achieved if the ratio of the hydraulically effective piston area of the bearing wall affixed to the bearing spring and the corresponding hydraulically active area of the compensating part comprising the absorption mass lies in the range between 1 to 16, and preferably in the range between 2 to 8. The first mentioned piston area comprises approximately two thirds of that area which is obtained if the underside of the bearing wall and the bearing spring is projected onto an area transverse to its direction of motion. The last mentioned area comprises the corresponding projected image of each absorption mass enlarged by 50% of the area of the adjoining annular diaphragm projected in the same way.

All of the annular diaphragms used in the engine mount according to the invention are fashioned in such a way that they can be molded without significant damping work. The compensating effect thereby becomes especially clearly noticeable.

The absorption masses employed suitably have a weight of 10 to 200 grams for uses in motor driven vehicles, and for uses in passenger cars, usually a weight of 10 to 50 grams. A construction of the compensating mass and that of the associated annular diaphragm deviating from absolute circularity is possible. Oval or polygon-shaped designs are possible.

The throttle port can be located in the rigidly affixed part of the partition wall, or in the relatively movable part of partitioning wall. Placing the throttle port in the rigidly fixed part of the partition wall is preferred.

BRIEF DESCRIPTION OF THE DRAWING

Preferred embodiments of the present invention will be described in conjunction with the figures of the drawings.

FIG. 4 is a cross-sectional plan view taken along line IV—IV of FIG. 3.

DETAILED DESCRIPTION

Figure 1:
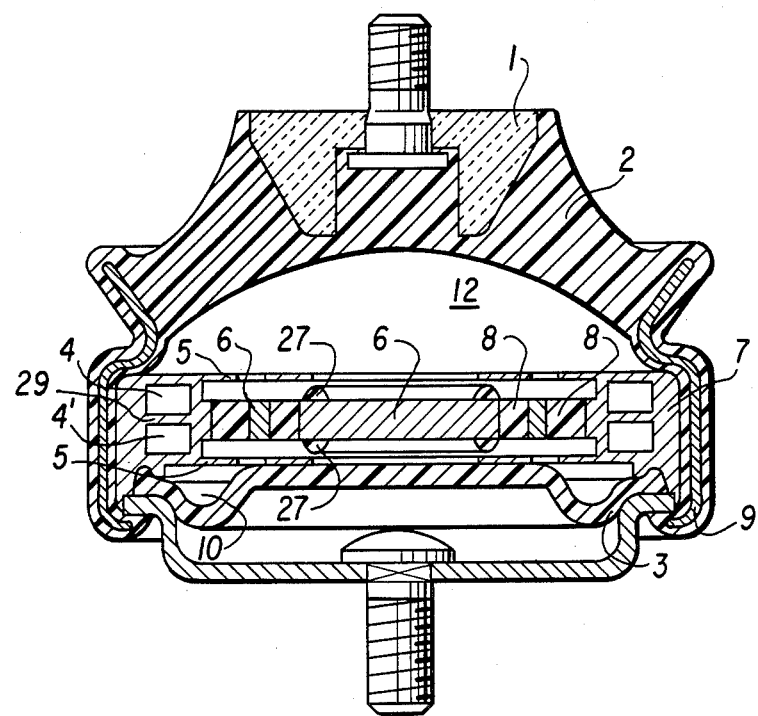
FIG. 1 is a schematic cross-sectional view taken along the section I—I shown in FIG. 4 of one embodiment of an engine mount in accordance with the present invention.
Figure 2:
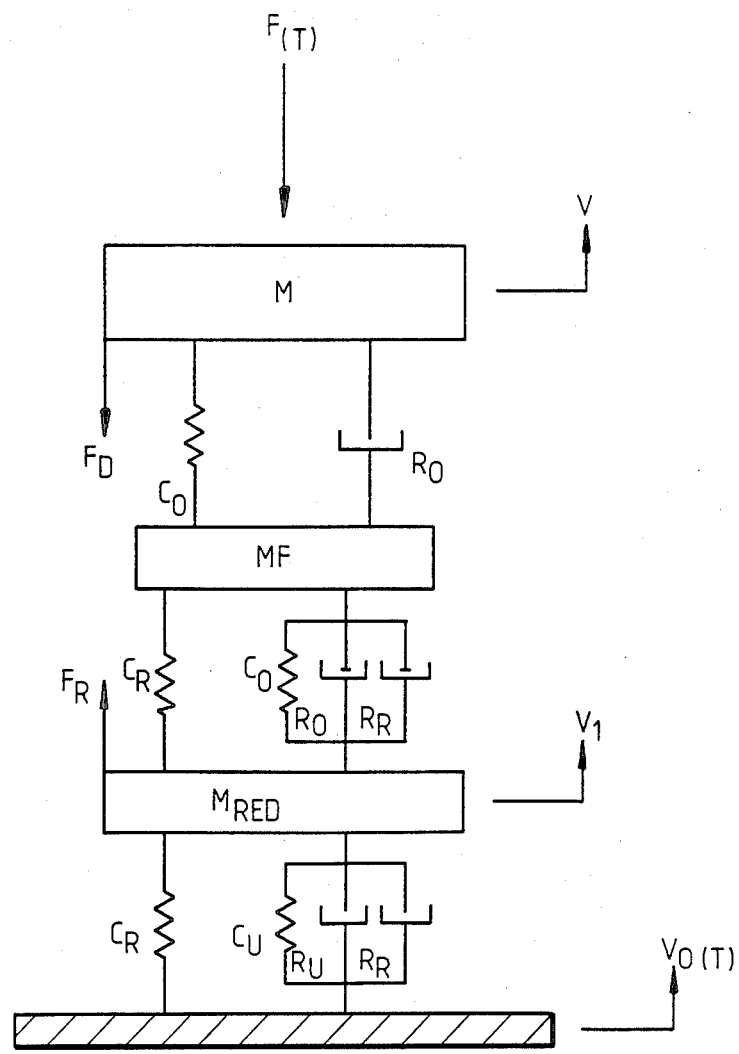
FIG. 2 is a physical equivalent diagram illustrating the operation of one embodiment of an engine mount in accordance with the present invention.

The engine mount shown in FIG. 1 contains a working chamber 12 delimited by a bearing member 1, a bearing spring 2, a bearing wall 9 and a partition wall 7. The bearing spring 2 which is an elastic material such as rubber connects the bearing member 1 to the bearing wall 9. A compensating chamber 10 is defined by the partition wall 7 and a resilient buffer wall 3. The outer portion of the partition wall 7 is rigidly connected to the bearing wall 9. The working chamber 12 and the compensating chamber 10 are connected in fluid communication by two throttle ports 4, 4' parallel to each other. The throttle ports 4, 4' which are located in the rigidly held part of the partition wall, are separated from each other by a radially extending annular wall 29 shown in FIGS. 1, 3 and 4A and may differ from each other in length and diameter. Like the working and the compensating chamber, the throttle ports 4, 4' are filled with a fluid of low viscosity, e.g., glycol and water. When the engine mount is installed in a motor vehicle, the bearing member 1 would be connected to the engine and the bottom plate below the resilient buffer wall 3 would be connected to the structural frame of the vehicle.

The partition wall 7 comprises in its central area a compensating part movable between the working chamber 12 and the compensating chamber 10. The compensating part is formed by one or two circular inertial masses 6* lying radially within each other. More than two inertial masses can be provided depending upon the desired tuning characteristics of the system. The inertial masses 6 are connected with each other and with the rigidly fixed part of the partition wall 7 by means of annular diaphragms 8. The annular diaphragms are suitably an elastomer material.

The range of motion of the inertial masses 6 is limited axially by stops 5. The stops 5 form a single piece component of the rigid part of the partition wall 7. Sounds of the inertial masses making contact with the stops are avoided by annular stop buffers 27, e.g. made of rubber, which are vulcanized in one piece to the inertial masses 6 lying on the inside.

The stop buffers have linear deformation. In the non-excited stated of the inertial masses, they may have, e.g., a distance on both sides from each of the associated stops of approximately 4 mm.

Figure 4:
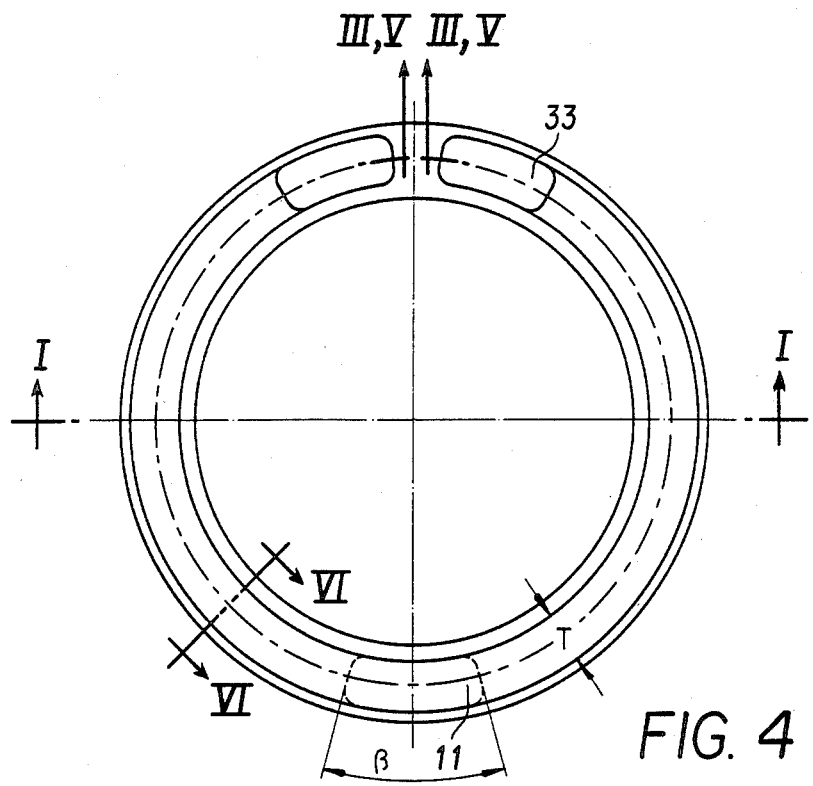
FIGS. 3 to 5 illustrate various embodiments of throttle ports located in the rigidly fixed part of the partition wall of the engine mount of the present invention with FIGS. 3 and 5 being schematic cross-sectional views taken along the circular sections III—III and V—V, respectively. The circular sections have been extended to lie in plane of the view shown in FIG. 3 and FIG. 5, respectively, but have been shortened as indicated.
Figure 4A:
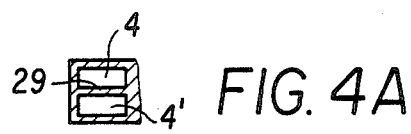
FIG. 4A is a view along line VI—VI of FIG. 4.
Figure 3:
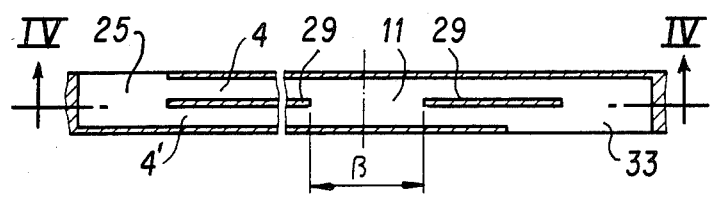

Mutual assignment and design of the individual ports forming the throttle ports 4, 4' are shown by way of example in FIGS. 3 and 4. In this case, both individual ports have identical cross sections which are rectangular. The ports may have different cross-sections and lengths. Ports 4, 4' are connected with each other through a transverse port 11 located at a distance from both ends of each port. The ratio of the cross-section of the transverse port 11 and each of the adjacent individual ports may suitably be from 1 to 3. The throttle ports 4, 4' have a common inlet 25 shown in FIG. 3 and FIG. 4 which communicates with working chamber 12 and a common outlet 33 which communicates with compensating chamber 10.

Figure 5:
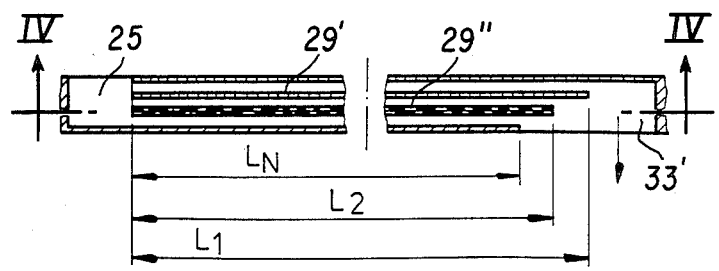

FIG. 5 illustrates a developed view of a throttle port comprised of any number of individual ports which can all be located in the rigid part of the partition wall 7 of a design similar to FIG. 1 and which can, if necessary or desired, have cross sections different from each other and lengths L1, L2, . . . LN varying from each other. The individual ports have a common inlet 25' shown in FIG. 5 which, similar to the FIG. 3 embodiment, communicates with working chamber 12 and a common outlet 33 which communicates with compensating chamber 10. The ports are separated from each other by radially extending annular walls 29', 29". The volumes contained in the individual throttle ports, and thus the particular masses of liquid contained in each throttle port, are different. This leads to their resonating upon the introduction of frequencies different from each other and to a high degree of damping for each of the particular frequencies. This is technically still utilizable in frequency ranges that are not adjacent and thus in a frequency band of a certain width. This permits the compensation of the effect of the damping of one of the individual ports decreasing as the result of introduced oscillations of gradually changing frequencies through the newly starting damping effect of one of the other individual ports of slightly increased length. Given a sufficiently large number of individual ports with appropriate finely varied mutual gradations of the lengths, excellent damping effects in a broad spectrum of frequencies can be achieved.

Figure 6:
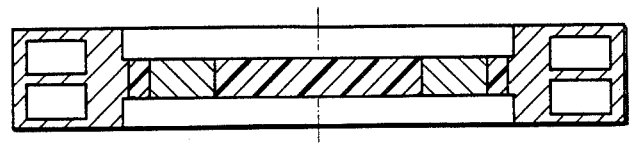
FIGS. 6 to 8 are schematic cross-sectional views of various embodiments of the inertial mass in accordance with the present invention.
Figure 7:
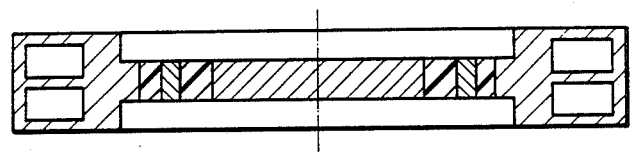
Figure 8:
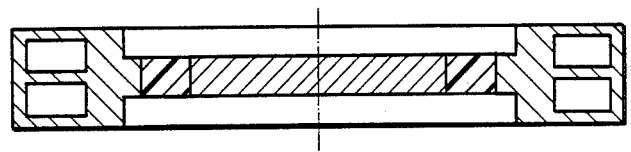

FIGS. 6 to 8 illustrate in cross section a variety of shapes for the design and the fastening of the inertial masses.

The inertial masses and the annular diaphragms supporting them are fsshioned rotationally symmetrical.

In FIGS. 9 to 12, different stops are shown which limit the axial motion of the inertial mass. In the nonoperating engine mount, they have, e.g., a distance of approximately 0.5 to 5 mm from the closest adjacent place of the inertial mass whereby mutual contact can only occur during effective overloading. In this way, unintentional destruction of the diaphragms is avoided. Clapping sounds can be effectively suppressed by installing stop buffers, with suitable geometry.

Figure 9:
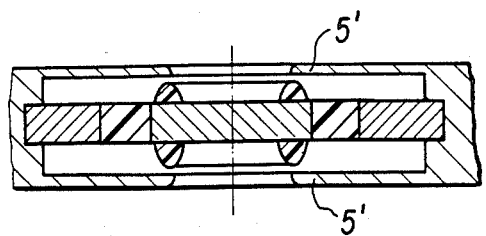
FIGS. 9 to 12 schematically illustrate various means of limiting the motion of the movable compensating part of the partition wall in accordance with the present invention.
Figure 10:
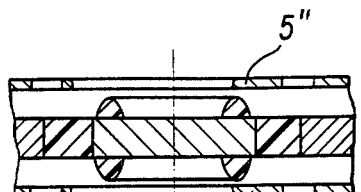
Figure 11:
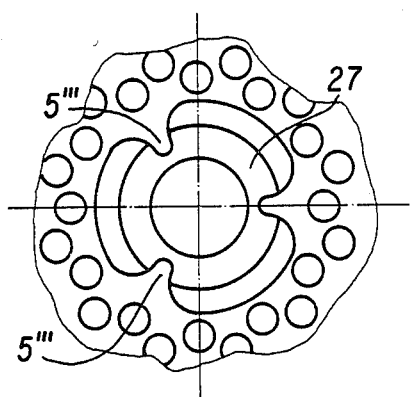

In the embodiments according to FIGS. 9 to 11, the stops 5', 5", 5''' are located in front of the inertial masses in the direction of motion. As a rule, they are circular, but may in the manner shown in FIG. 11 comprise cams distributed uniformly on the circumference projecting radially inwardly and adapted to abut against stop buffer 27.

Figure 12:
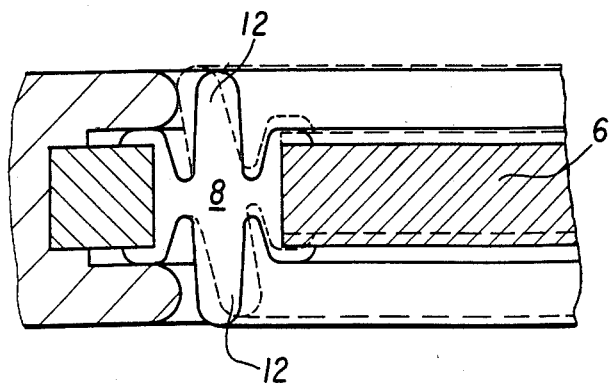

In FIG. 12, a stop is shown which encloses the inertial mass 6 and the annular diaphragm 8 radially at an axial distance. Depending on the deflection direction of the inertial mass 6, it can be contacted by one or the other of the two annular bulges 12 of the annular diaphragm 8, which leads to a limitation of the axial motion of the inertial mass 6. The stops in this embodiment do not in any way hinder the manner in which the pressure of the fluid contained in the working chamber acts upon the inertial mass 6. The effectiveness of the inertial mass 6 is thereby optimized and ensures that uncoupling of high frequency oscillation is achieved.

Although preferred embodiments of the present invention have been described in detail, it will be understood that modifications may be made by one skilled in the art all within the spirit and the scope of the present invention as defined in the claims.

What is claimed is:

1. An engine mount having hydraulic damping comprising:
   a bearing member, a bearing wall, and an annular bearing spring connecting said bearing member to said bearing wall, together defining a working chamber;
   means comprising a resilient buffer wall defining a compensating chamber;
   a partition wall disposed between said working chamber and said compensating chamber;
   a compensation part movable between said working chamber and said compensating chamber disposed radially within said partition wall, said compensating part comprising a circular inertial mass;
   an annular elastic diaphragm means connecting said compensating part to said partition wall;
   stop means for limiting the movement of said compensating part between said working chamber and said compensating chamber; and
   throttle port means for connecting said working chamber and said compensating chamber in fluid communication, with said throttle port means, said working chamber, and said compensating chamber filled with an incompressible fluid,
   said throttle port means comprising a common inlet connected to said working chamber, a plurality of channels connected at one of their ends to said common inlet and at another of their ends to a common outlet, said common outlet being connected to said compensation chamber, whereby said channels are arranged in parallel to each other.

2. An engine mount according to claim 1 wherein said circular inertial mass comprises at least one circular disc lying radially within an annular disc, said discs connected to each other by annular diaphragm means.

3. An engine mount according to claim 1 wherein each channel has a different cross-section.

4. An engine mount according to claim 1 further comprising a transverse port disposed intermediate said common inlet and common outlet connecting said channels together.

5. An engine mount according to claim 4 wherein the ratio of the cross-section of the transverse port and the cross-section of each of the channels is between 1 and 3.

6. An engine mount according to claim 1 wherein said partition wall has an outer portion rigidly connected to said bearing wall of said engine mount and said channels are located one above the other in said outer portion and said channels being separated from each other by a radially extending annular wall.

7. An engine mount according to claim 1 wherein said channels have different lengths.

8. An engine mount according to claim 4 wherein said channels have different lengths.

* * * * *